United States Patent
Aravelli et al.

(10) Patent No.: US 12,050,207 B2
(45) Date of Patent: Jul. 30, 2024

(54) APPARATUS AND METHOD FOR EVALUATING RADIAL COMPRESSIVE STRENGTH OF A CERAMIC HONEYCOMB SAMPLE

(71) Applicant: CORNING INCORPORATED, Corning, NY (US)

(72) Inventors: Krishna Sastry Aravelli, Painted Post, NY (US); Achim Karl-Erich Heibel, Corning, NY (US); Seth Thomas Nickerson, Corning, NY (US); Mitchell E Smith, Avoca, NY (US); Prashanth Abraham Vanniamparambil, Ellicott, MD (US)

(73) Assignee: Corning Incorporated, Corning, NY (US)

( * ) Notice: Subject to any disclaimer, the term of this patent is extended or adjusted under 35 U.S.C. 154(b) by 402 days.

(21) Appl. No.: 17/612,731

(22) PCT Filed: May 13, 2020

(86) PCT No.: PCT/US2020/032620
§ 371 (c)(1),
(2) Date: Nov. 19, 2021

(87) PCT Pub. No.: WO2020/236478
PCT Pub. Date: Nov. 26, 2020

(65) Prior Publication Data
US 2022/0236157 A1   Jul. 28, 2022

Related U.S. Application Data

(60) Provisional application No. 62/850,237, filed on May 20, 2019.

(51) Int. Cl.
*G01N 3/12*   (2006.01)
*G01N 3/02*   (2006.01)

(52) U.S. Cl.
CPC ............. *G01N 3/12* (2013.01); *G01N 3/02* (2013.01); *G01N 2203/0019* (2013.01); *G01N 2203/0048* (2013.01); *G01N 2203/0658* (2013.01)

(58) Field of Classification Search
CPC ........ G01N 3/32; G01N 29/045; G01N 29/07; G01N 29/12; G01N 22/00; G01N 29/222;
(Continued)

(56) References Cited

U.S. PATENT DOCUMENTS

| 3,906,782 A | 9/1975 | Early et al. |
| 4,192,194 A | 3/1980 | Holt |

(Continued)

FOREIGN PATENT DOCUMENTS

| EP | 3173766 A1 | 5/2017 |
| JP | 01-097429 A | 4/1989 |

(Continued)

OTHER PUBLICATIONS

International Search Report and Written Opinion of the International Searching Authority; PCT/US2020/032620; dated Jul. 29, 2020; 12 pages; European Patent Office.

*Primary Examiner* — Brandi N Hopkins
(74) *Attorney, Agent, or Firm* — Kevin M. Able

(57) ABSTRACT

An apparatus and methods for evaluating the radial compressive strength of ceramic honeycomb samples. The apparatus includes a housing defining a testing compartment. A pressure subsystem is configured to introduce a pressurizing fluid into the testing compartment. A flexible member is in fluid communication with the pressure subsystem. The flexible member defines a testing area within the testing compartment configured to receive the ceramic honeycomb sample. The flexible member expands inwardly and subjects the honeycomb sample to a compressive force by engaging (Continued)

against the outer surface of the honeycomb sample when pressurized by the pressurizing fluid. An end cap covers an end face of the ceramic honeycomb sample when the ceramic honeycomb sample is positioned in the testing compartment. An acoustic sensor disposed on the end cap is configured to translate acoustic waveforms propagating through the acoustic sensor to a signal representative of the acoustic waveforms.

19 Claims, 13 Drawing Sheets

(58) Field of Classification Search
CPC .......... G01N 33/18; G01N 29/11; G01N 3/02; G01N 29/036; G01N 33/4925; G01N 30/76; G01N 29/14; G01N 2291/0289; G01N 29/228; G01N 29/043; G01N 29/4454; G01N 33/383; G01N 3/40; G01N 29/28; G01L 23/08; G01M 3/002; G01H 1/00; C04B 35/195; G01K 11/24; B01D 46/2476
See application file for complete search history.

(56) References Cited

U.S. PATENT DOCUMENTS

| | | |
|---|---|---|
| 4,768,379 A | 9/1988 | Arcas et al. |
| 5,339,693 A | 8/1994 | Rowlands et al. |
| 6,405,602 B1 | 6/2002 | Itou et al. |
| 6,729,190 B1 | 5/2004 | Boyko et al. |
| 10,094,750 B2 | 10/2018 | Iida et al. |
| 2002/0157454 A1* | 10/2002 | Shimada ................ G01N 3/12 73/807 |
| 2004/0079167 A1 | 4/2004 | Boyko et al. |
| 2004/0079267 A1 | 4/2004 | Nakajima et al. |
| 2008/0237428 A1 | 10/2008 | Kobayashi et al. |
| 2009/0223301 A1 | 9/2009 | Schwab |
| 2012/0204650 A1* | 8/2012 | Kleven ............... G01N 29/2462 73/644 |
| 2017/0153169 A1 | 6/2017 | Iida et al. |

FOREIGN PATENT DOCUMENTS

| | | |
|---|---|---|
| JP | 2010-121966 A | 6/2010 |
| JP | 4944048 B2 | 5/2012 |
| JP | 2017-096879 A | 6/2017 |
| WO | 2017/123919 A1 | 7/2017 |

* cited by examiner

APPARATUS AND METHOD FOR EVALUATING RADIAL COMPRESSIVE STRENGTH OF A CERAMIC HONEYCOMB SAMPLE

CROSS REFERENCE TO RELATED APPLICATIONS

This is a national stage application under 35 U.S.C. § 371 of International Application No. PCT/US2020/032620, filed on May 13, 2020 which claims the benefit of priority under 35 U.S.C. § 119 of U.S. Provisional Application No. 62/850,237 filed on May 20, 2019, the content of which is incorporated herein by reference in its entirety.

BACKGROUND

This application generally relates to isostatic strength testing apparatus for testing ceramic honeycomb samples and methods for using the same.

SUMMARY

All examples and features mentioned below can be combined in any technically possible way.

In one aspect, an apparatus for evaluating the radial compressive strength of a ceramic honeycomb sample is provided. The apparatus comprises a housing defining a testing compartment; a pressure subsystem configured to introduce a pressurizing fluid into the testing compartment; a flexible member disposed within the testing compartment and in fluid communication with the pressure subsystem, the flexible member defining a testing area within the testing compartment configured to receive the ceramic honeycomb sample, wherein the flexible member is configured to expand inwardly and subject the honeycomb sample to a compressive force by engaging against the outer surface of the honeycomb sample when pressurized by the pressurizing fluid; an end cap covering an end face of the ceramic honeycomb sample when the ceramic honeycomb sample is positioned in the testing compartment; and an acoustic sensor disposed on the end cap and configured to translate acoustic waveforms propagating through the acoustic sensor to a signal representative of the acoustic waveforms.

In some embodiments, the end cap is in direct contact with the end face of the honeycomb sample when the honeycomb sample is loaded in the testing compartment. In some embodiments, the end cap comprises a protective pad that is in direct contact with the end face of the honeycomb sample when the honeycomb sample is loaded in the testing compartment.

In some embodiments, the acoustic sensor is engaged with a waveguide defined by the end cap. In some embodiments, the waveguide is comprised of a material having a density greater than a density of the ceramic honeycomb sample. In some embodiments, the waveguide comprises a thickness separating the acoustic sensor from the end face of the honeycomb sample that is equal to a multiple of a quarter-wavelength ($n\lambda/4$) of a predetermined frequency, wherein the predetermined frequency is within a range detectable by the acoustic sensor. In some embodiments, the predetermined frequency is selected as a frequency expected to be produced when walls of the honeycomb sample experience cracking. In some embodiments, the end cap comprises a channel and the acoustic sensor is located at an end of the channel that positions the acoustic sensor proximate to the testing compartment.

In some embodiments, the apparatus further comprises a pressure sensor configured to monitor a pressure of the pressurizing fluid. In some embodiments, the apparatus further comprises a controller in signal communication with the acoustic sensor and configured to analyze the signal for an indicator of a compromised wall of the ceramic honeycomb sample. In some embodiments, the indicator comprises an amplitude of the acoustic waveform detected by the acoustic sensor exceeding a threshold.

In another aspect, a method for testing the compressive strength of a ceramic honeycomb sample is provided. The method comprises the steps of applying a predetermined radial compressive pressure to a ceramic honeycomb sample; generating one or more signals from an acoustic sensor disposed in an end cap covering an end face of the ceramic honeycomb sample; and analyzing the one or more signals for an indicator of a compromised wall of the ceramic honeycomb sample.

In some embodiments, the acoustic sensor is disposed engaged with a waveguide defined by the end cap. In some embodiments, the analyzing comprises comparing an amplitude of the acoustic waveform detected by the acoustic sensor to a threshold value. In some embodiments, the analyzing comprises determining whether a count of acoustic waveform amplitudes exceed a threshold. In some embodiments, the analyzing comprises determining whether a risetime of one or more peak of the acoustic waveforms, or an average risetime of the one or more peaks, exceeds a threshold. In some embodiments, the acoustic sensor is engaged with a waveguide defined by the end cap.

In some embodiments, the waveguide comprises a thickness separating the acoustic sensor from the end face of the honeycomb sample that is equal to a multiple of a quarter-wavelength ($n\lambda/4$) of a predetermined frequency, wherein the predetermined frequency is within a range detectable by the acoustic sensor. In some embodiments, the predetermined frequency is selected as a frequency expected to be produced when walls of the honeycomb sample experience cracking.

The details of one or more implementations are set forth in the accompanying drawings and the description below. Other features, objects, and advantages will be apparent from the description and the drawings, and from the claims.

DETAILED DESCRIPTION

Ceramic honeycomb structures, such as those used in catalytic converters, must withstand compressive forces experienced during the "canning" process—the process of being encased in a metal container for use in an automotive exhaust system. To test whether a given batch of ceramic honeycomb structures meets the radial compressive strength requirements ("isostatic strength"), one or more samples 14 from the batch are subjected to isostatic strength testing until sample failure (the sample cracks or otherwise breaks).

Some isostatic strength testing apparatus may be slow to operate, test only a subset of samples from a given batch, or necessarily damage the tested samples. Acoustic sensors used on isostatic strength testing apparatus may have poor signal-to-noise ratios due to detecting acoustic waveforms through a compressive boot.

Figure 1:
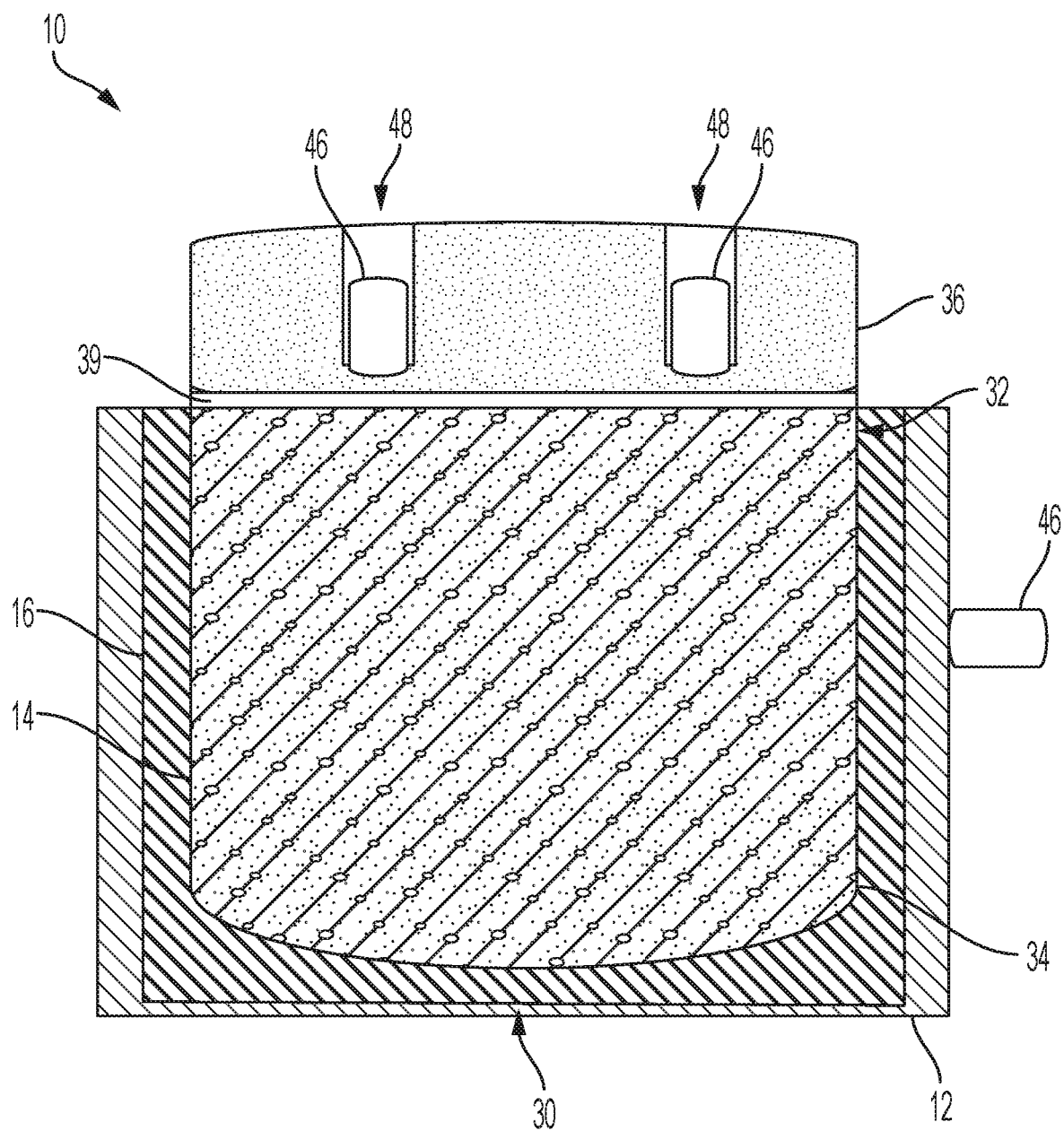
FIG. 1 is a cross-section view of an isostatic strength testing apparatus, according to an example.

FIG. 1 depicts an example apparatus 10 for testing the isostatic strength of a ceramic honeycomb sample 14. The ceramic honeycomb sample 14 can be formed in any known or discovered manner. For example, in one embodiment, the ceramic honeycomb sample 14 comprises a matrix of intersecting walls defining channels or cells therebetween, which channels or cells extend longitudinally along the length of the honeycomb sample 14. The channels or cells can be square, triangular, rectangular, hexagonal, polygonal, etc. The honeycomb sample 14 can be formed, for example, by extrusion of a ceramic forming material through an extrusion die as a green body, which is then cut, dried, and fired into a final ceramic honeycomb body. The ceramic forming material can comprise inorganics (e.g., alumina, silica, etc.), binders (e.g., methylcellulose), pore formers (e.g., starch, graphite, resins), a liquid vehicle (e.g., water), sintering aids, or any other additives helpful in the manufacture of the final ceramic honeycomb body. The final ceramic honeycomb body can comprise cordierite, aluminum titanate, alumina, mullite, silicon carbide, and/or other ceramic materials, or combinations thereof.

As shown in FIG. 1, apparatus 10 comprises a housing 12 defining a testing compartment dimensioned to receive a ceramic honeycomb sample 14. For example, a testing compartment can be generally cylindrical so as to be circumferentially disposed about the sample 14, the sample 14 being shaped, generally, as a cylinder. In an example, the housing 12 can comprise a metallic or composite sleeve. Apparatus 10 further comprises a flexible member 16 disposed within the testing compartment. Flexible member 16 defines a testing area disposed circumferentially about the sample 14 (e.g., a cylindrical testing area) such that the flexible member 16 is between the sample 14 and a surface of the housing 12. As another example, the ceramic honeycomb sample 14, the housing 12, and/or the flexible member 16 may take a different shape, e.g., elliptical.

During operation, fluid is supplied into a space 18 (shown, for example, in FIGS. 2A-2B) between the exterior wall of flexible member 16 and the interior wall of housing 12 to expand the flexible member 16 inwardly, preferably providing uniform compressive force on the periphery of the sample 14 by engaging the flexible member 16 against the outer surface of the honeycomb sample 14. As the flexible member 16 expands inwardly, the internal cross-sectional diameter of the testing area will diminish, applying uniform radial pressure to the sample 14.

Figure 2B:
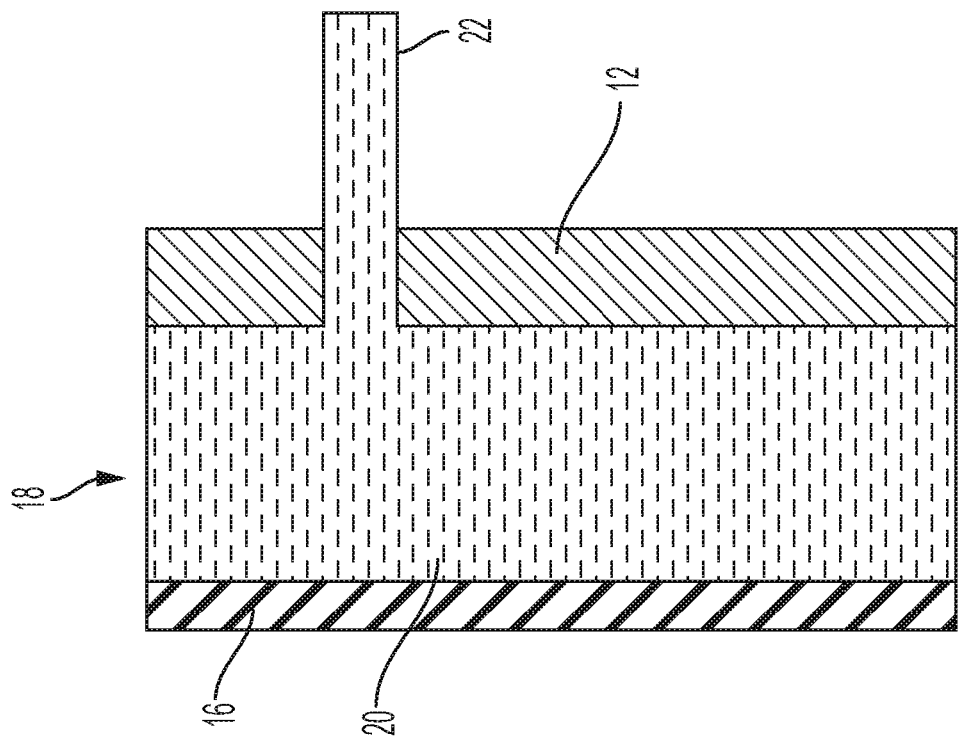
FIG. 2B is a partial cross-section view of an isostatic strength testing apparatus, according to an example.
Figure 2A:
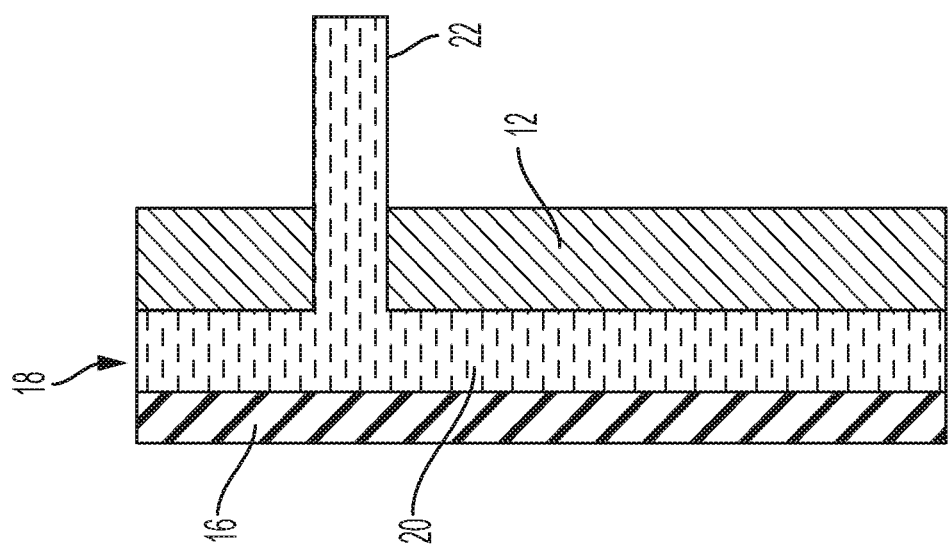
FIG. 2A is a partial cross-section view of an isostatic strength testing apparatus, according to an example.
Figure 3B:
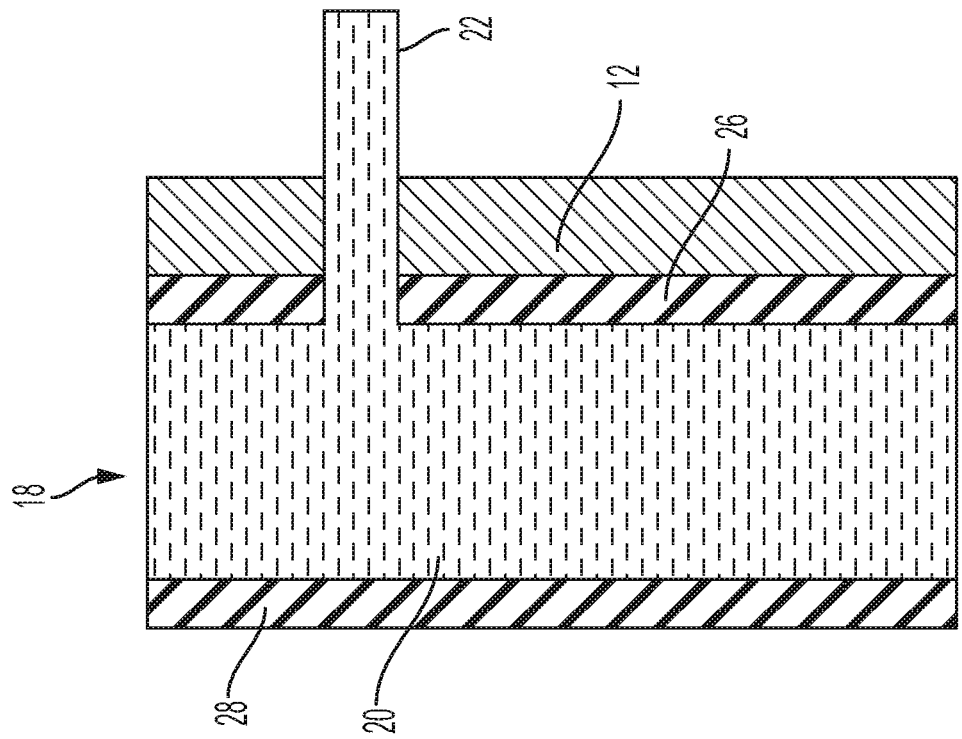
FIG. 3B is a partial cross-section view of an isostatic strength testing apparatus, according to an example.
Figure 3A:
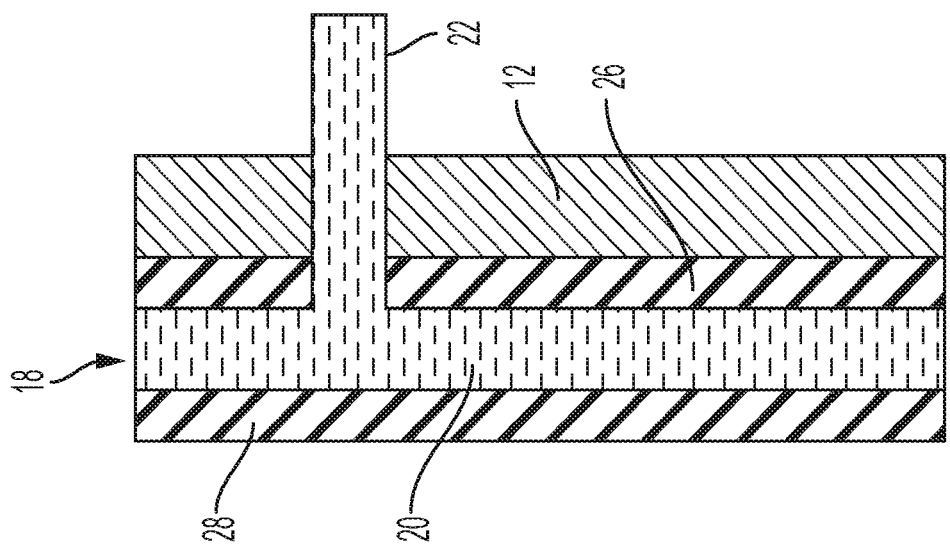
FIG. 3A is a partial cross-section view of an isostatic strength testing apparatus, according to an example.

FIG. 2A, depicts a partial cross-sectional view of the housing 12, the flexible member 16, and the space 18 between housing 12 and flexible member 16, filled with pressurizing fluid 20. In FIG. 2B additional pressurizing fluid 20 has been introduced into space 18, via fluid inlet 22, resulting in inward expansion of flexible member 16 (shown as moving leftward in the cross-section view of FIG. 2B with respect to FIG. 2A) and, consequently, compressive pressure applied to the sample 14. In an alternate example, shown in FIGS. 3A-3B, the flexible member 18 comprises an inflatable cuff or sleeve, such that the space into which the pressurizing fluid 20 is introduced is a cavity 24 defined within flexible member 16 between an outer wall 26 and an inner wall 28 of the flexible member 16.

The pressure applied can be a user-defined predetermined pressure. In an example, the predetermined pressure can be a maximum expected pressure the sample 14 will experience during the canning process and/or during use. Alternatively, the predetermined pressure can be some margin greater than the maximum expected pressure (e.g., the maximum expected pressure multiplied by a safety factor) the sample 14 will experience during the canning process and/or during use. A sample 14 that fails as a result of the application of the predetermined pressure will crack or otherwise experience compromised structural integrity.

Figure 4A:
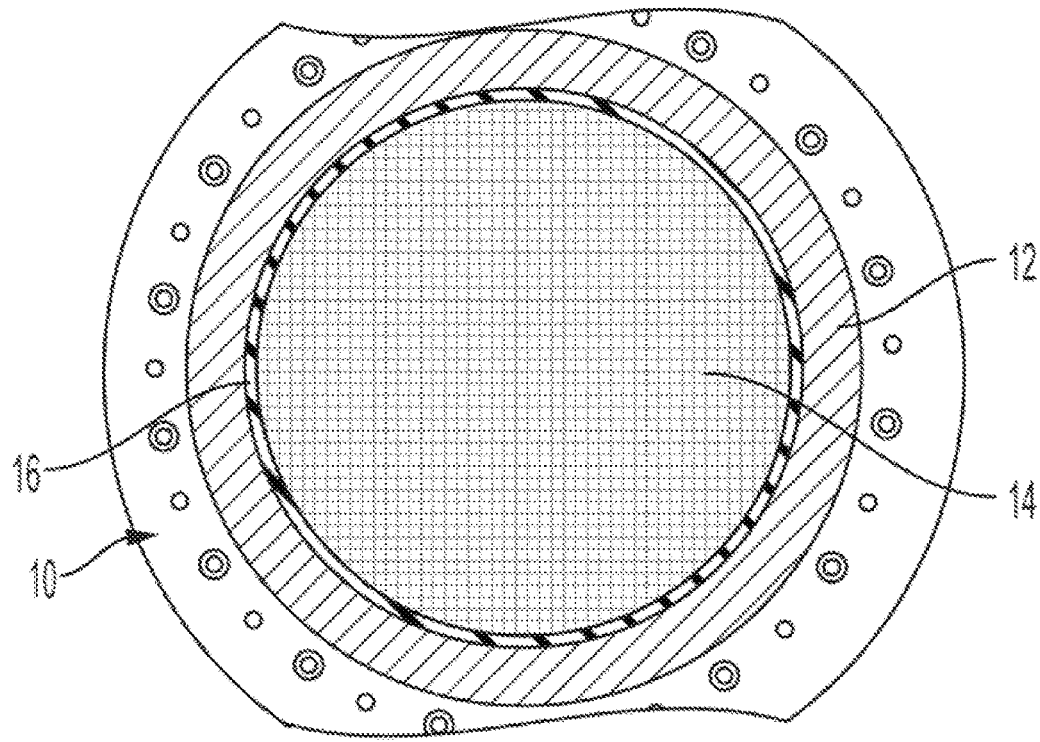
FIG. 4A is a top view of an isostatic strength testing apparatus prior to conducting a test on a sample, according to an example.
Figure 4B:
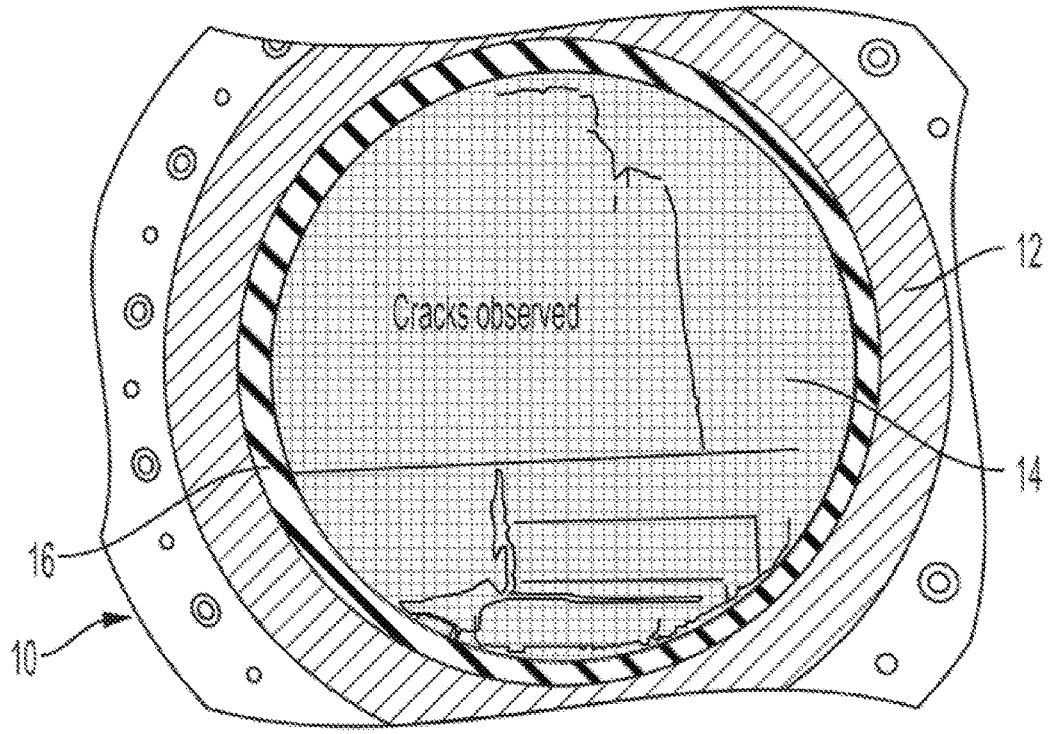
FIG. 4B is a top view of an isostatic strength testing apparatus after conducting a test on a sample, according to an example.

FIG. 4A depicts a top view of apparatus 10 before compressive pressure is applied to sample 14. In FIG. 4A, the exposed end face of sample 14 does not contain any cracks. FIG. 4B depicts the same end face after the application of a predetermined pressure to intentionally introduce cracks in the sample being evaluated (hence the increased thickness and decreased internal diameter of flexible member 16). The end face in FIG. 4B bears cracks and defects along the end face as a result of the predetermined pressure. That is, the walls of the matrix of intersecting walls crack, break apart, and/or separate from each other due to the applied pressure. A sample 14 that passes the compressive test will not bear any cracks introduced by the testing process.

Returning to FIG. 1, lower end 30 of testing compartment can be closed, forming, for example, a base on which a sample 14 can be seated. The opposing open end 32 (i.e., terminating in an aperture) can receive the sample 14 to be tested. The lower end 30 of testing compartment can be integrally formed with the housing 12 (e.g., with the interior walls of the testing compartment) or can be configured to be removable. For example, the lower end 30 can be a platform on which the honeycomb sample 14 is first positioned, such that the housing 12 is placed onto the platform over and around the honeycomb sample 14. Flexible member 16 can, additionally, have one closed end 34, such that pressure may be applied to both the curved surface of sample 14 and the end face of sample 14 adjacent the closed end 34 of the flexible member 16.

In alternate embodiments, the testing compartment can be defined by an open cylinder, that is, a cylinder having substantially cylindrical interior walls but open ends. A cross-section view of this example is shown in FIG. 10A. In this example, the flexible member 16 can comprise a cuff, likewise having open ends, such that pressure is only applied to the curved circumferential surface of the sample 14 (i.e., radial pressure). The flexible member 16 can be sized to have an axial length shorter than the axial length of the sample 14, such that one or both end faces of the sample 14 protrude beyond through the open end of the flexible member 16. For example, the sample 14 can extend by 1-2 inches from the open end of flexible member 16, although even shorter axial lengths of the flexible member 16 are contemplated. Of course, in another example, the flexible member 16 can have an axial length greater than or equal to the axial length of the sample 14, such that the periphery of the honeycomb sample 14 is engaged against the flexible member 16 along the entire axial length of sample.

As shown in FIGS. 1 and 10A, an exposed end of the sample 14 can be covered with an end cap 36 prior to initiating the compressive test. In the open cylinder example (FIG. 10A), the remaining open end can be similarly covered with an end cap 36 if desired. In an example, end cap 36 can be coupled to housing 12 (e.g., with a screw, bracket, or other mechanical fastener) or be held against housing 12 with, for example, a pneumatically-driven arm, magnetism, etc. Alternatively, end cap 36 can rest on top of housing 12 or the end face of the sample 14. End cap 36 can function to seal the testing compartment, or can simply cover an end face of the sample 14. As shown in FIG. 1, end cap 36 can further comprise a protective pad 39 (e.g., a gel pad) that contacts the surface of the sample 14 to prevent any chipping or other damage to the end face during the test process.

In an example, end cap 36 can be disposed directly against an end face of the honeycomb sample 14, i.e., without any intervening structure (such as a portion of flexible member 16) between end cap 36 and the adjacent end face of sample 14. As will be described below, this can be used to aid in the detection of failures.

Figure 5:
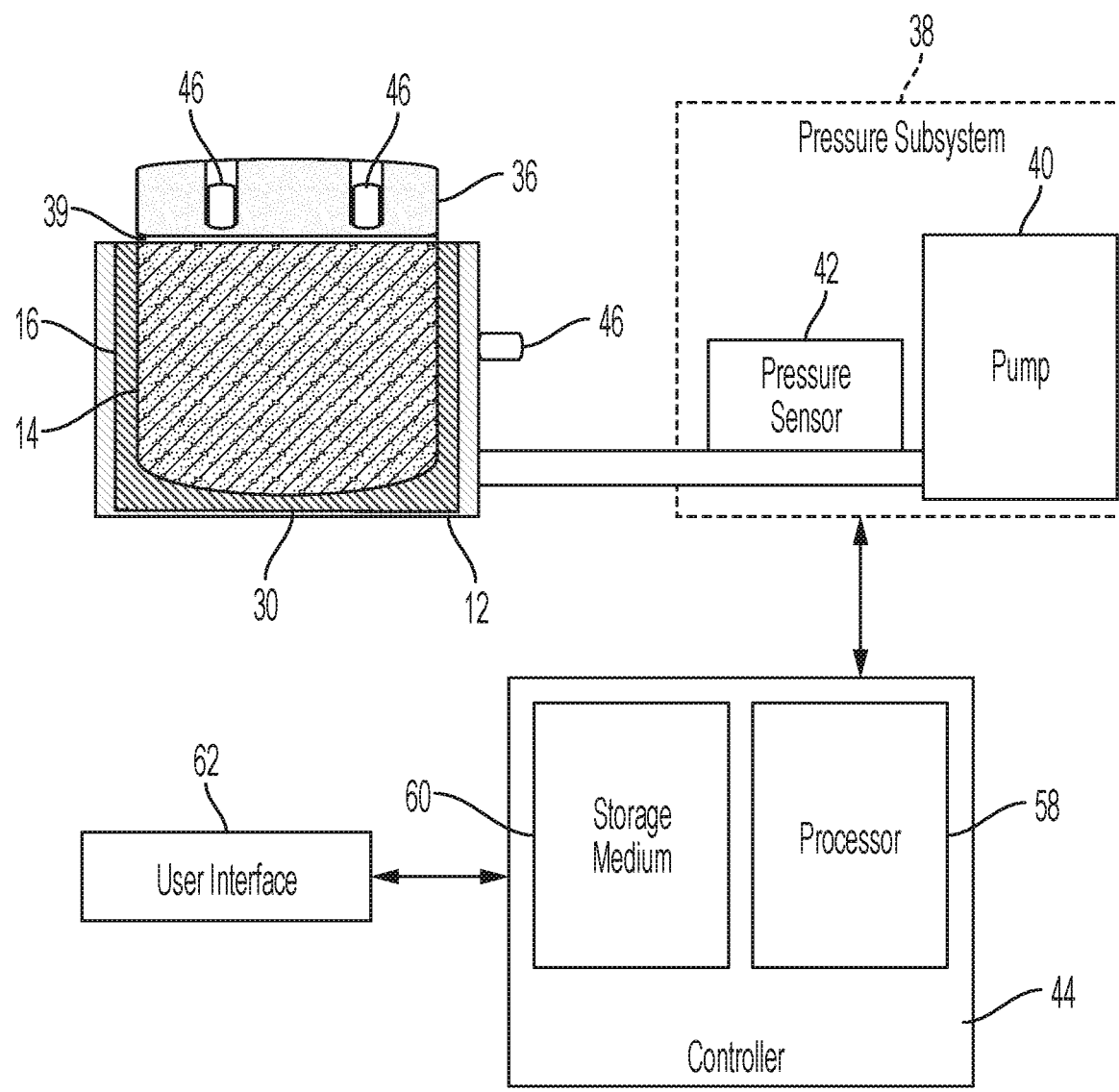
FIG. 5 is a schematic of an isostatic strength testing apparatus, according to an example.

As shown in FIG. 5, in an example, apparatus 10 further comprises a pressure subsystem 38. The pressure subsystem 38, at a high level, can perform tasks such as introducing the pressurizing fluid 20 via fluid inlet 22 to the space 18 (or cavity 24), and removing the pressurizing fluid 20 when the test is complete. Pressure subsystem 38 can thus comprise a pump 40 for introducing and removing the pressurizing fluid to and from the space 18 or cavity 24. The pump 40 can be a pneumatic pump, if the pressurizing fluid is gas, or a hydraulic pump, if the pressurizing fluid is a liquid. The pressure subsystem 38 preferably comprises a pressure sensor 42 to determine when a predetermined pressure has been reached.

The pressure subsystem 38 can be in communication with a controller 44 for controlling the application and removal of pressure to the sample 14 (e.g., controlling the actuation of pump 40) and for receiving inputs from the pressures sensor 42, which can be used to determine when a predetermined pressure has been reached or for determining a sudden drop in pressure indicative of a failure of the sample 14.

Apparatus 10 can also comprise one or more acoustic sensors 46 operably positioned about or in housing 12 and/or end cap 36 to detect an acoustic signal (i.e., sound) associated with the failure of the sample 14 as a result of the applied compressive force. Acoustic sensor 46 will detect acoustic waveforms propagating from the sample 14 as a voltage signal having a magnitude and frequency representative of the acoustic waveform. Acoustic sensor 46 can be, for example, a piezo-electric sensor, although any suitable acoustic sensor 46 can be employed. The acoustic sensor 46 can be configured to detect acoustic waveforms in the frequency range of 10-1000 kHz, although other ranges are contemplated. Acoustic sensor 46 can be mechanically coupled to end cap 36 or housing 12, or elsewhere within or about apparatus 10, by a couplant, e.g., an adhesive such as hot glue, super glue, gels, etc.

Acoustic sensors 46 can likewise be in communication with controller 44. As will be described in detail below, controller 44 can be arranged to receive and analyze a signal received from each acoustic sensor. Controller 44 can further determine whether a sample 14 has passed or failed the test, according to the analyzed signal.

As described above, and as shown in FIG. 5, acoustic sensor 46 can be disposed on or within end cap 36. Because the end cap 36 can be disposed at the end of the sample 14 (e.g., in direct contact with the end face of the sample 14) without an intervening flexible member 16, and, as a result, without intervening fluid for applying compression to the sample 14, an acoustic sensor 46 disposed within the end cap 36 is well-positioned to detect the acoustic signature that accompanies the failure of the sample 14. Indeed, in testing, the signal-to-noise-ratio ("SNR") of an acoustic sensor 46 in the end cap 36 was found to be higher than the same acoustic sensor 46 positioned on the side of housing 12.

Furthermore, as shown in FIG. 5, in addition to the end cap 36, one or more acoustic sensors 46 can be disposed about the exterior or interior of the housing 12, operatively positioned to detect the acoustic signal indicative of failure. Although only one acoustic sensor 46 is shown disposed about the exterior of housing 12, it should be understood that any number of acoustic sensors 46 can be disposed about the housing 12 as is suitable for detecting the acoustic signal.

Figure 6:
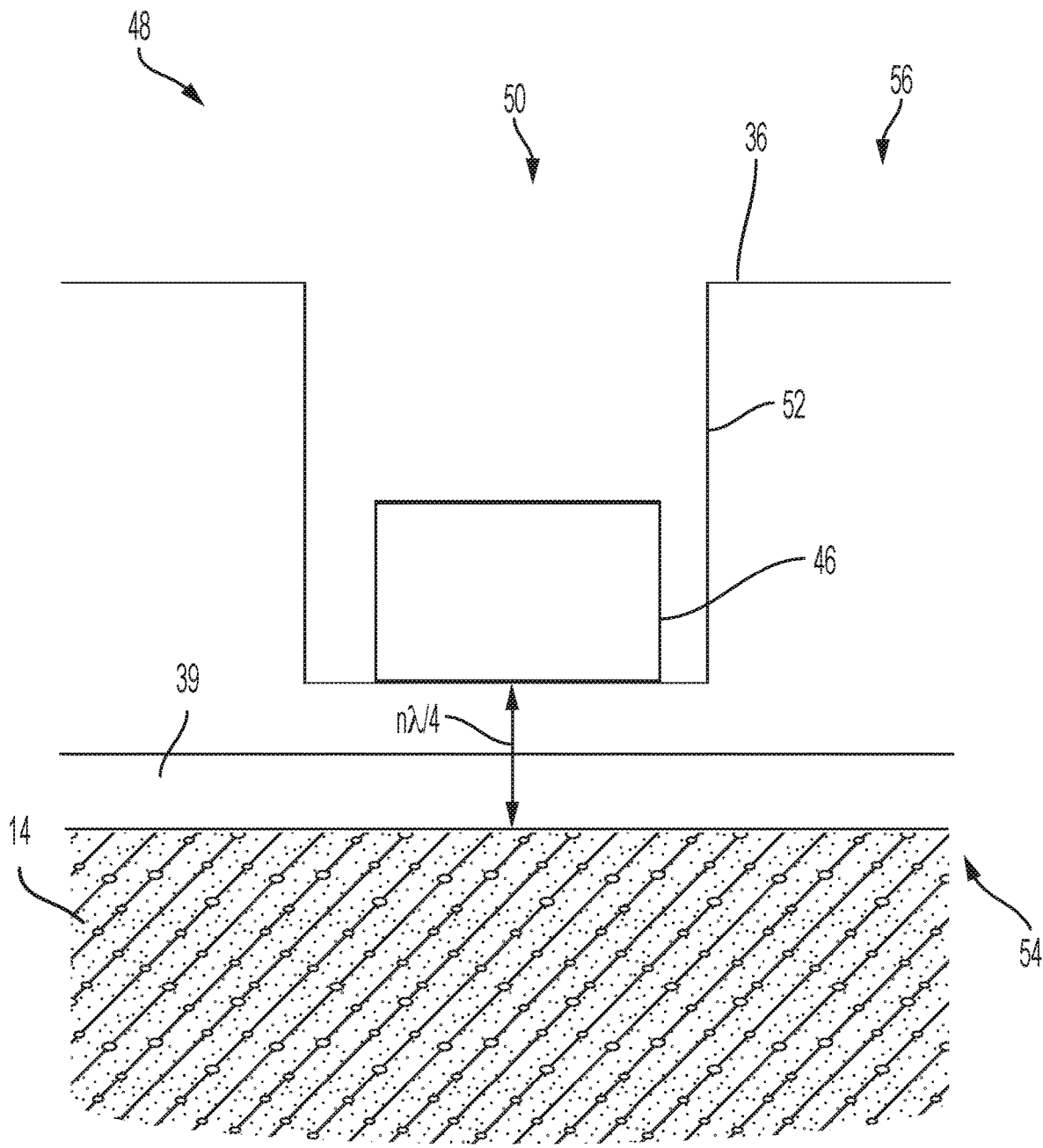
FIG. 6 is a cross-section view of an acoustic waveguide, according to an example.

Each acoustic sensor 46, or a subset of acoustic sensors 46, can be respectively positioned within a portion of the end cap 36 acting as an acoustic waveguide 48 for guiding acoustic waves to acoustic sensor 46 with diminished loss, permitting better detection of a failure of the sample 14. In an example, the end cap 36 comprises a channel 50, as shown in FIG. 6. In an example, walls 52 defining channel 50 extend in a direction substantially parallel to the direction in which the acoustic signal emitted from sample 14 propagates through acoustic sensor 46. The channel 50 enables the acoustic sensor 46 to be protected during use, while also positioning the acoustic sensor 46 proximate to the end face of the honeycomb sample 14. By positioning the acoustic sensors 46 close to where the acoustic waveforms (audible noises resulting from the honeycomb sample 14 cracking) are originating, the acoustic detection can be improved. In other examples, the interior walls 52 of acoustic waveguide can extend in a direction transverse or oblique to the axial length of sample 14.

End cap 36 comprises a first end 54 and a second end 56, the first end 54 arranged proximate to or engaged against the end face of the honeycomb sample 14. In the example shown, the acoustic sensor 46 is disposed at the first end of the waveguide 48. The second end, by contrast, is free (i.e., the interior walls 52 terminates in an aperture), in the embodiment shown in FIG. 6. The example of FIG. 6 is merely provided as an example, and that, in other examples, the waveguide 48 can be curved or otherwise bent in a way advantageous for propagation or, alternately, filtering of certain frequencies or frequency bands. Furthermore, the acoustic sensor 46 can be placed at points within waveguide 48 found to be advantageous for detecting the acoustic signals emitting from failure of a sample 14, such as in the channel 50 and as further described below.

Acoustic waveguide 48 can be arranged so that a distance between the acoustic sensor 46 and the end face of the honeycomb sample 14 is approximately equal to a multiple of a quarter wavelength ($n\lambda/4$) of an expected or predetermined frequency of the acoustic signal. Advantageously, this can be useful for improving the signal to noise ratio for the expected frequency or frequencies. In other words, the thickness of the waveguide 48 (including the thickness of the protective pad 39, if included) disposed between the acoustic sensor 46 and the end face of the honeycomb sample 14, can be set to $n\lambda/4$ of the expected frequency. That is, the noise produced by cracking of the walls of the honeycomb sample 14 will have a frequency and/or a range of frequencies. It is expected that similar honeycomb bodies subjected to the same testing will produce cracking noises of a common expected frequency, or common band or range of expected frequencies. The expected frequency, or range or band of frequencies, can be determined, e.g., theoretically or experimentally, such as by mathematical modeling or by breaking honeycomb samples and monitoring the sounds produced. The expected frequency may be different for different types of honeycomb samples (e.g., based on properties such as ceramic material composition, wall thickness, cells per square inch, etc.). In this way, the predetermined frequency, can, for example, be a frequency, or the center frequency of a frequency band, for which the magnitude of the acoustic signal is expected to be greatest, or which is otherwise expected to be readily identifiable by the acoustic sensor 46 during each testing operation. If multiple acoustic sensors 46 are used, the waveguide 48 can have different thicknesses between each acoustic sensor and the end face of the honeycomb sample 14, such that each acoustic sensor 46 will more readily detect a frequency (or set of frequencies) of the waveform for which the respective the sensor 46 is tuned.

In addition, to promote propagation of the acoustic signal through waveguide 48 interior walls of waveguide 48 can preferably be comprised of a material denser than the sample 14. For example, interior walls of waveguide 48 can be comprised of acrylic or other material having greater density than the sample 14. In an example, the larger structure in which the waveguide 48 is defined can be comprised of a denser material as well. For example, the end cap 36 can be formed entirely of acrylic.

Returning to FIG. 5, controller 44 can comprise, in an example, a processor 58 and memory, e.g., a non-transitory data storage medium configured to store program code that, when executed by the processor, carries out the functionalities described in this disclosure, such as analysis of signals from the acoustic sensors 46 and pressure sensor 42 and control of pump 40. Controller 44 can be implemented by a processor, a microcontroller, or other suitable computing device. Alternately, controller 44 can be implemented in hardware (such as an ASIC or FPGA), firmware, or as a combination of hardware, firmware, and/or software. In addition, controller 44 can be implemented as collection of processors and non-transitory storage mediums (e.g., a collection of microprocessors acting in concert).

Controller 44 can be further in communication with user interface 62 for notifying a user of a failure, or absence of a failure, of the sample 14. User interface 62 can, for example, be an LED or a display, such as a screen.

As mentioned above, signal or signals received from each acoustic sensor 46 can be analyzed for features indicative of a failure, i.e., indicators that the honeycomb sample 14 has been compromised, e.g., experienced cracking. That is, the process of the walls of the honeycomb sample 14 breaking, cracking, separating, or otherwise being compromised will be accompanied by one or more sounds, the acoustic waveform of which can be detected by the acoustic sensors 46 as described herein. Thus, the acoustic waveform may have one or more parameters that can be identified as an indicator that the walls of the honeycomb sample 14 have been comprised, i.e., have cracked. In this way, identification of such indicators can be used, for example, to enable apparatus 10, e.g., via the controller 44, to determine when cracking has occurred. For example, such indicators can be used by the apparatus 10 to distinguish the sound produced during cracking from ambient noise or other sounds in the testing environment (e.g., the sound produced while pressurizing the honeycomb sample 14 with the pressurizing fluid 20).

Figure 7A:
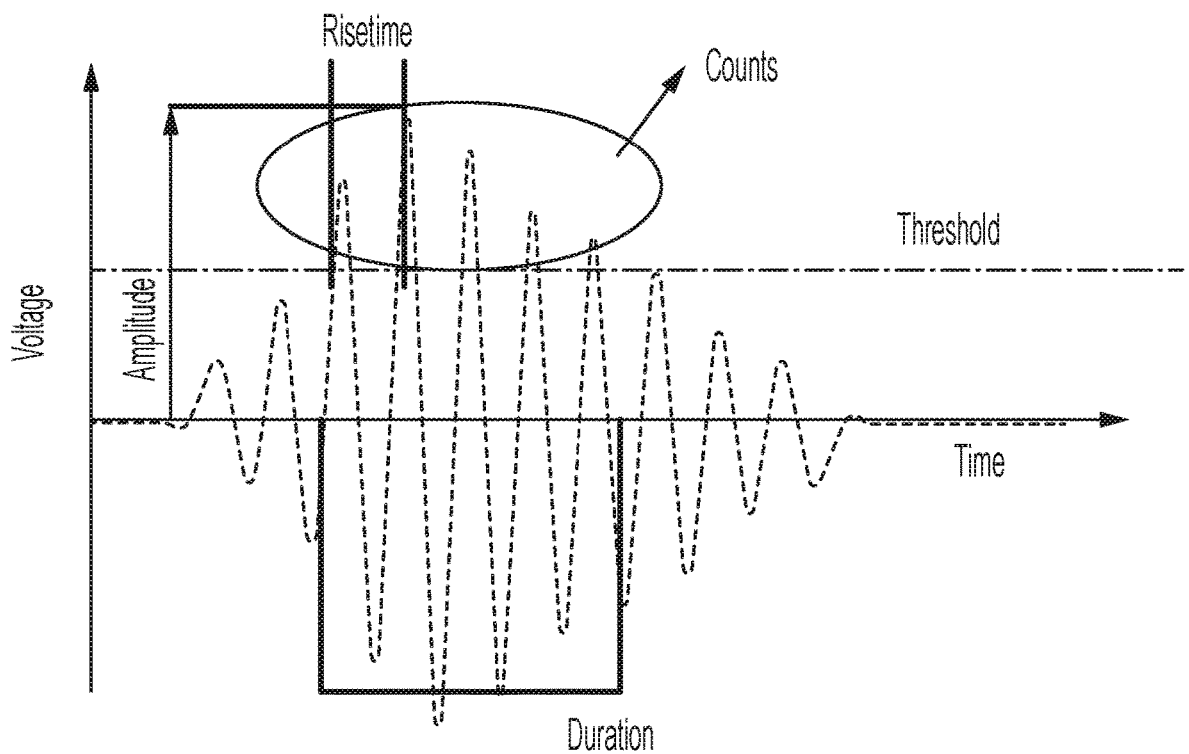
FIG. 7A is a graph depicting a signal from an acoustic sensor in the time domain, according to an example.
Figure 7B:
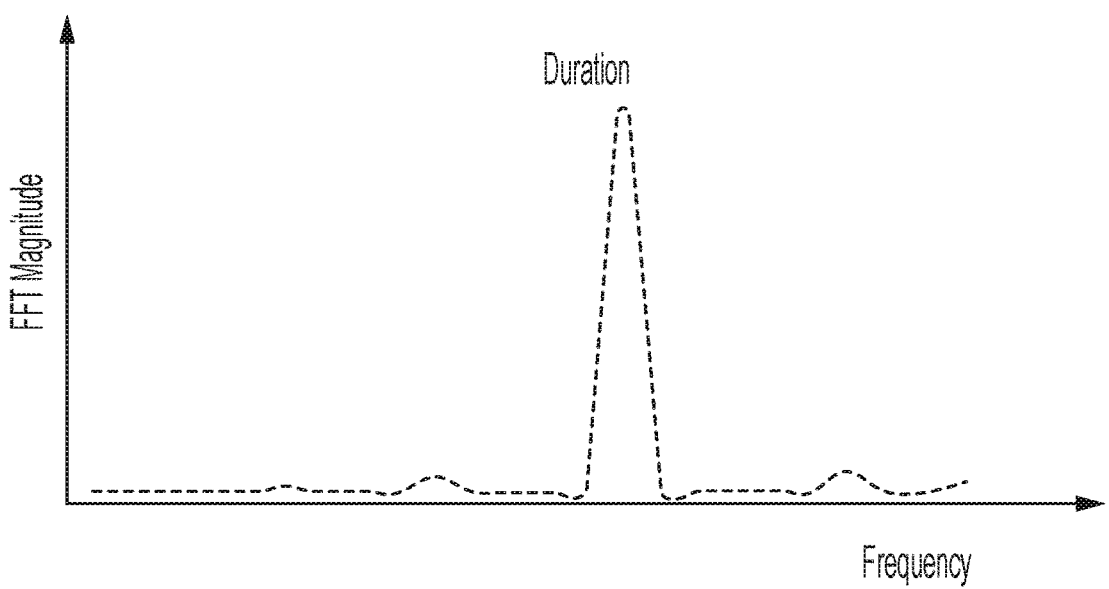
FIG. 7B is an example signal from an acoustic sensor in the frequency domain, according to an example.

The features analyzed for indicators of cracking can include: frequency, count, risetime, amplitude, fast Fourier transformation (FFT) magnitude, and duration. These are shown, by way of example, in FIG. 7A. Briefly described, the peak amplitude is the amplitude of the highest observed peak. The risetime is the period of time occurring between the signal crossing of the predetermined threshold and reaching the peak value (this may be performed for each peak following and including the first peak exceeding the threshold). The duration is the period of time between the first peak crossing the threshold and the last peak crossing the threshold. And the count is the number of peaks crossing the threshold over the course of the duration. Each of the above features can be recorded and analyzed. FIG. 7B depicts the signal in the frequency domain (e.g., having been transformed using an FFT). In this domain, the frequency associated with the greatest magnitude can be recorded and analyzed. The above-described features are merely provided as examples, and it should be understood that any feature useful for determining the occurrence of a failure can be recorded and analyzed.

Figure 8A:
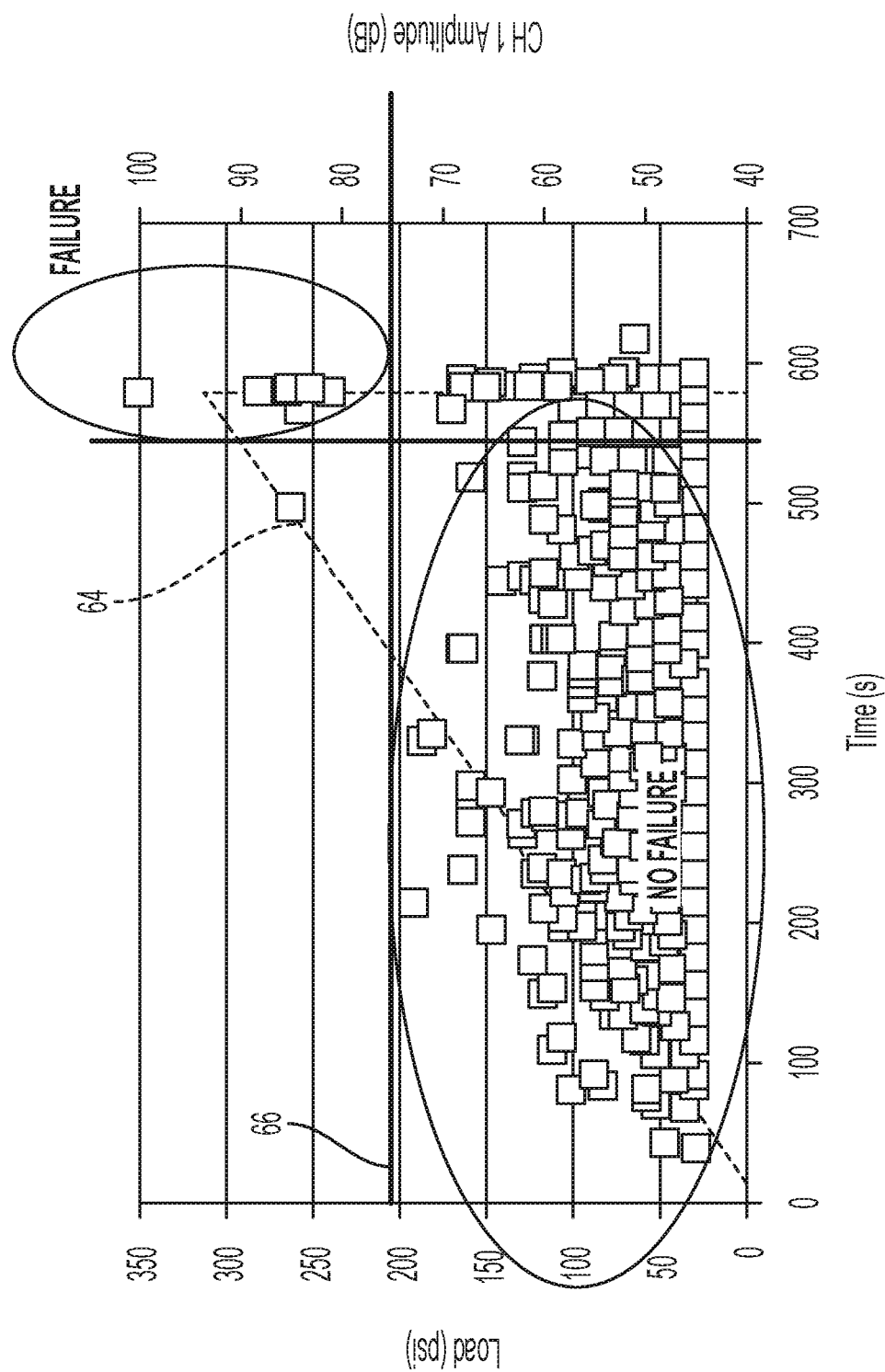
FIG. 8A is a graph depicting recorded magnitudes from a first acoustic sensor signal, according to an example.
Figure 8B:
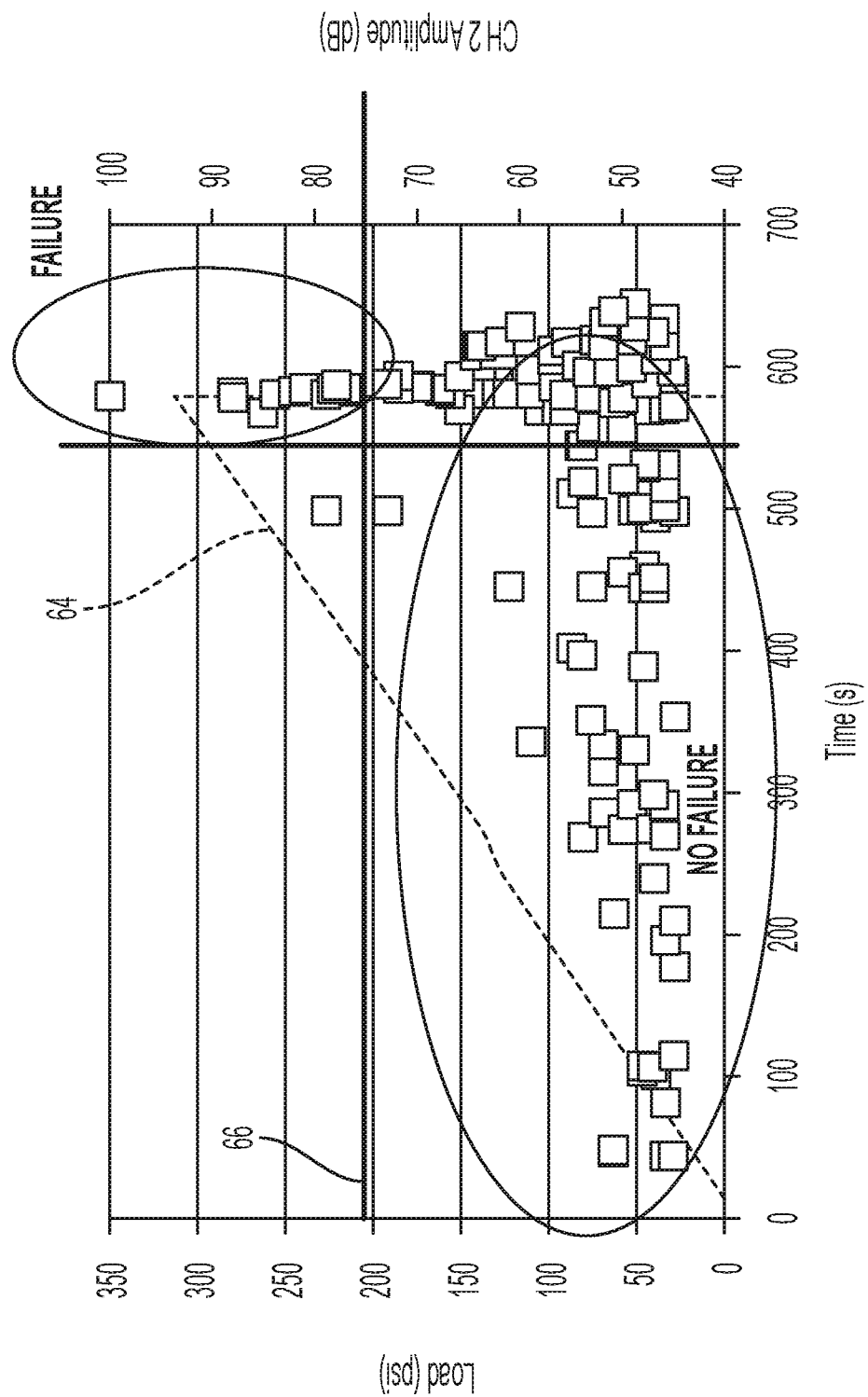
FIG. 8B is a graph depicting recorded magnitudes from a second acoustic sensor signal, according to an example.
Figure 8C:
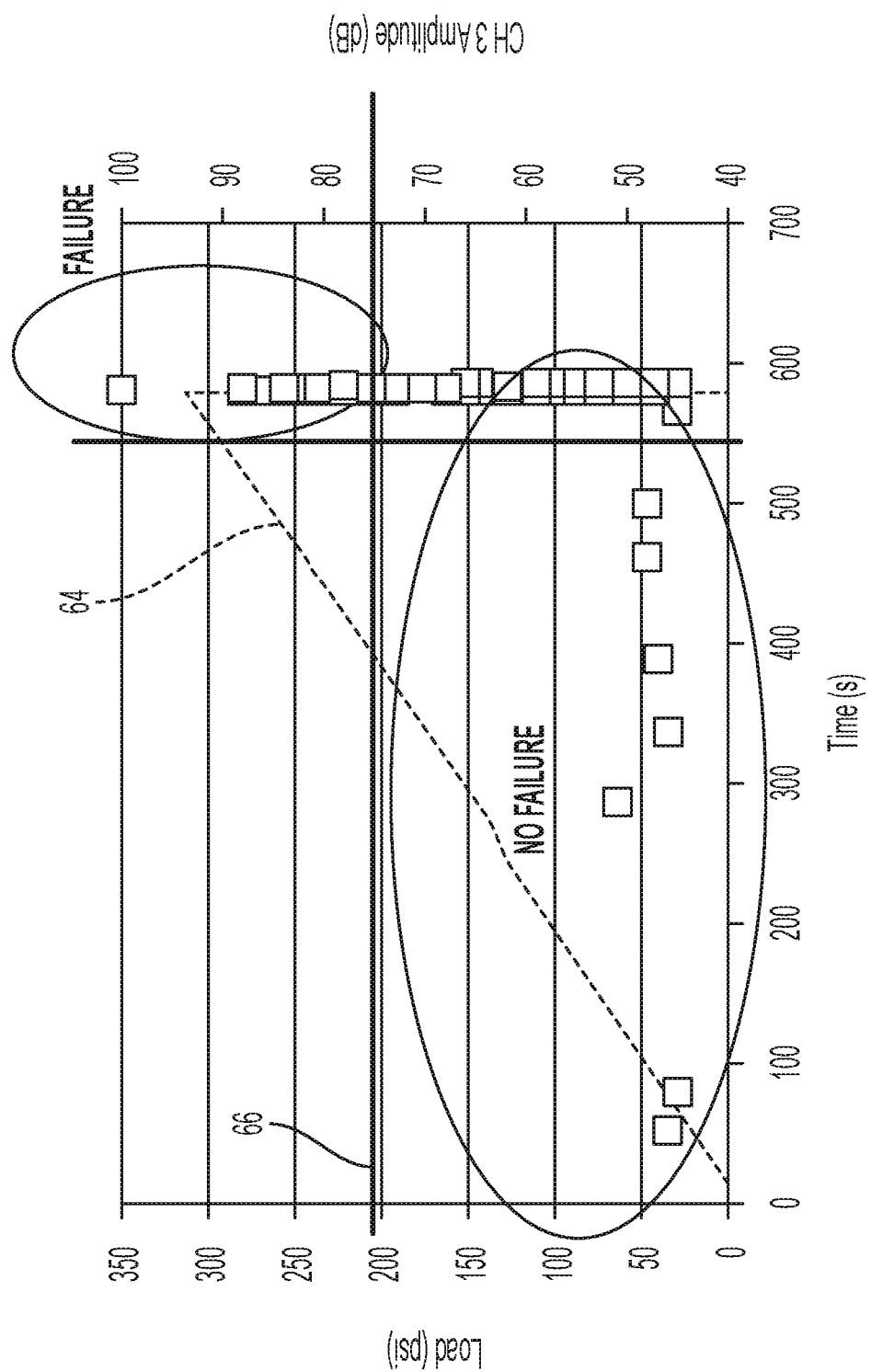
FIG. 8C is a graph depicting recorded magnitudes from a third acoustic sensor signal, according to an example.

Example outputs of a compressive test, using an apparatus 10 similar to the apparatus 10 shown in FIG. 1, are depicted in FIGS. 8A-8C. FIGS. 8A and 8B depict the outputs of two acoustic sensors 46 disposed in waveguides 48 defined in the end cap 36, and FIG. 8C depicts the output of an acoustic sensor 46 disposed on the exterior of the housing 12. In each of FIGS. 8A-8C, the x-axis is time over which pressure is applied to the sample 14. The pressure is slowly ramped over time, such that the applied pressure, in psi, follows the line 64; each of FIGS. 8A-8C thus shows the application of pressure over time. FIGS. 8A-8C also depict the amplitude of the signal in decibels, at a respective point in time. Until approximately 550 seconds into the test of these figures, corresponding to approximately 300 psi applied to the sample 14, nearly all recorded amplitudes fell below a threshold 66 indicative of failure (this threshold can be different than the predetermined threshold for conducting the analysis, described above). The amplitudes falling below the threshold are collectively marked as "No Failure." For example, there may be some level of ambient or background noise during the testing process, which is below the level set by the threshold 66 (in the region marked "No Failure"), with detected noises above the threshold 66 (in the region marked "Failure") interpreted as the result of cracking, and thus, failure of the honeycomb sample 14 at the currently applied pressure. Analysis of the received acoustic waveforms and comparison to the threshold 66 can be performed by the controller 44.

Once, however, sufficient pressure (approximately 300 psi in the plotted data of FIGS. 8A-8C) is applied by apparatus 10 to cause cracking, honeycomb sample 14 fails and a plurality of audio signals are recorded at above the threshold magnitude. The amplitudes rising above the threshold are collectively marked as "Failure." The "Failure" amplitudes correspond, for example, to the relatively sudden audible popping and cracking noises that result from the intersecting walls of the honeycomb sample 14 breaking apart and/or separating from other walls in the matrix, as cracks form and propagate in the honeycomb sample 14. Again, by setting the threshold 66 as a noise level that above that of the level of the background or ambient noise, recorded audio signals above the threshold 66 can be determined as failure (cracking) of the sample 14 being tested.

If the predetermined pressure (e.g., a maximum pressure to which the honeycomb bodies are expected to be subjected during use, as discussed above) is fully applied without the acoustic sensor 46 detecting a magnitude above the threshold 66, then the honeycomb samples can be non-destructively tested.

It can be observed that acoustic sensors 46 disposed in the acoustic waveguides 48 of the end cap 36 were capable of recording more audio samples than the acoustic sensor 46 disposed on the side of the housing 12, due to the improved signal to noise ratio at the end cap waveguides 48.

Figure 9:
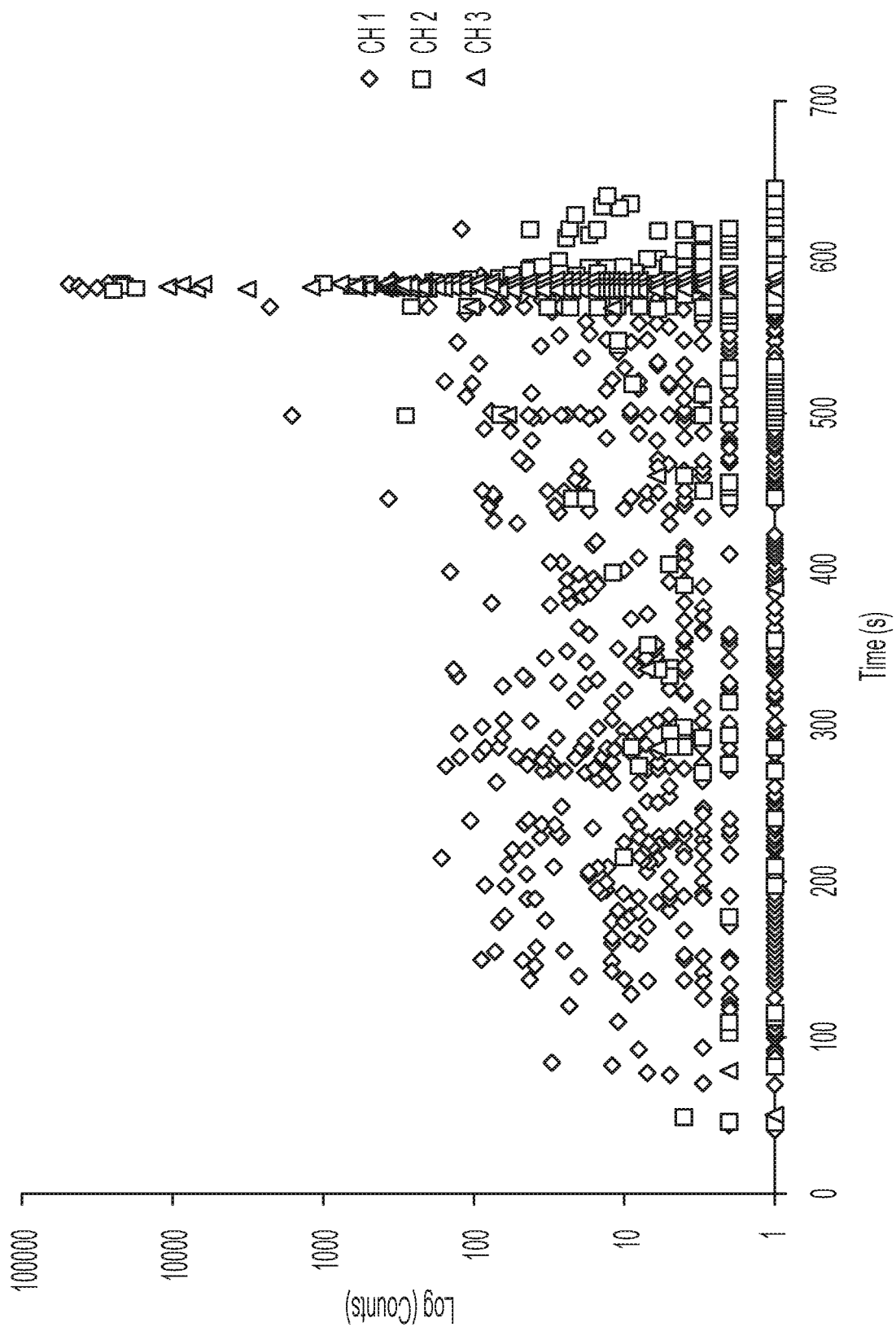
FIG. 9 is a graph depicted recorded counts from three acoustic sensors, according to an example.

FIG. 9 depicts the results of the same test, measuring, instead, the count of the signal received from the respective acoustic sensors, over time. The various channels, channel 1, channel 2, and channel 3, correspond, respectively, to the first acoustic sensor 46 disposed in the end cap 36 wave guide, the second acoustic sensor 46 disposed in the end cap 36 waveguide 48, and the acoustic sensor 46 disposed on the housing 12 exterior. At approximately 550 seconds, the recorded counts (representing an increase in frequency of peaks exceeding the predetermined threshold, as described above) sharply increase, indicating a failure. Again, it can be observed that the channel 1 and channel 2 were more sensitive than channel 3 due to the improved signal-to-noise ratio of the acoustic sensors 46 disposed in the end cap 36 waveguide 48.

Controller 44 can determine whether any of the observed features exceeds a respective threshold (e.g., whether the count exceeds a count threshold, whether the risetime of any given peak, or the average risetime of each peak, exceeds the risetime threshold, etc.) or whether any of the observed features falls within a predetermined window. The various thresholds and windows corresponding to failure of a sample 14 can be determined empirically, e.g., by observing the values recorded upon the occurrence of a failure. In this way, controller 44 can determine whether a given sample 14 has failed or passed the compressive test. A failure or pass can be indicated to the user via a user interface 62, such as an LED or screen. However, in another example, instead of determining whether a sample 14 has passed or failed, the controller 44 can output, via e.g., a screen or print out, the recorded values for additional analysis by the user.

FIGS. 10A-10D depict a cross-sectional view of apparatus 10 at various stages of testing a ceramic honeycomb sample 14, according to an example. During a first stage, shown in FIG. 10A, the sample 14 can be placed (either by user or robotically) in the testing compartment. At this stage, the flexible member 16 is not yet expanded to apply compressive force to the exterior of the sample 14.

Figure 10B:
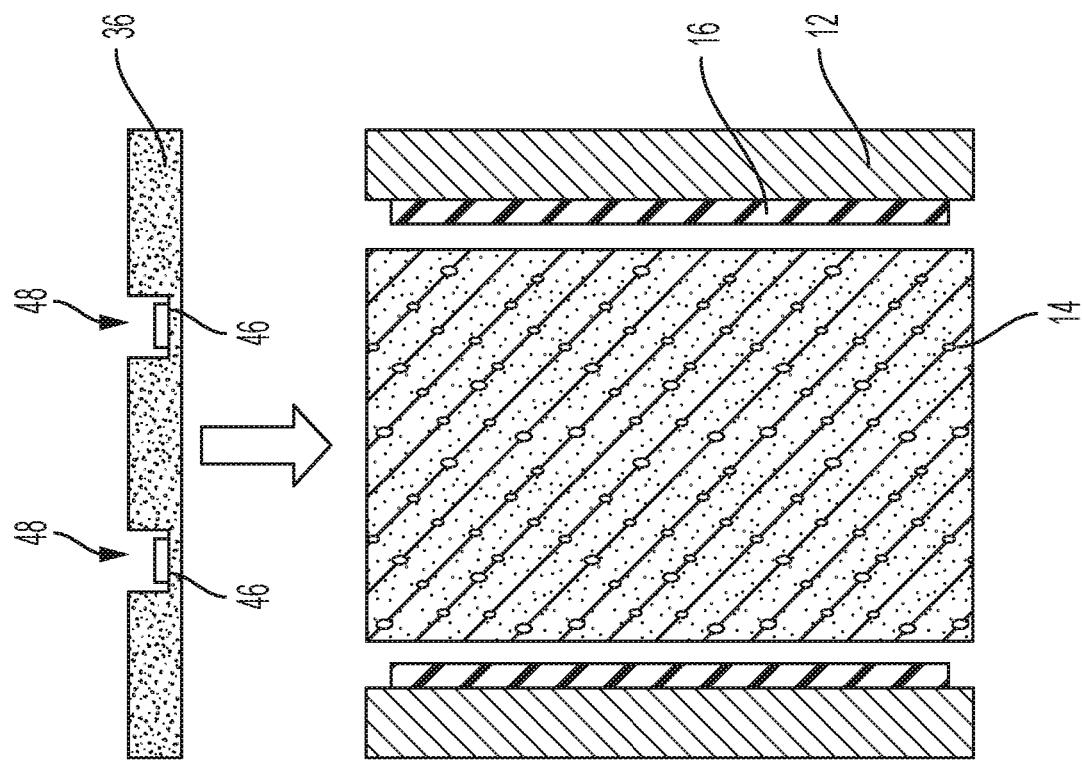
FIG. 10B is a cross-section view of an isostatic strength testing apparatus in a second stage of testing, according to an example.
Figure 10A:
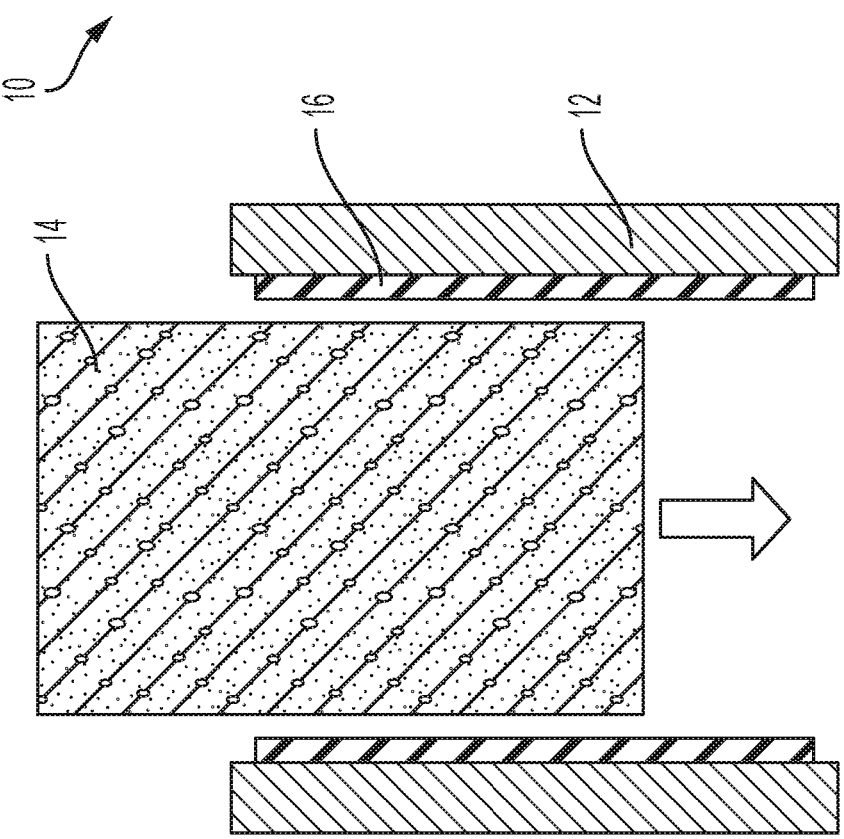
FIG. 10A is a cross-section view of an isostatic strength testing apparatus in a first stage of testing, according to an example.

As shown in FIG. 10B, at a second stage an end cap 36 comprising one or more acoustic sensors 46 can be placed at one end face of the sample 14. The end cap 36 can be placed at either end. Alternately, two end caps 36, one at each end, can be used. In yet another example, one end cap 36 can remain on housing 12, while the sample 14 loaded from the other end.

Figure 10C:
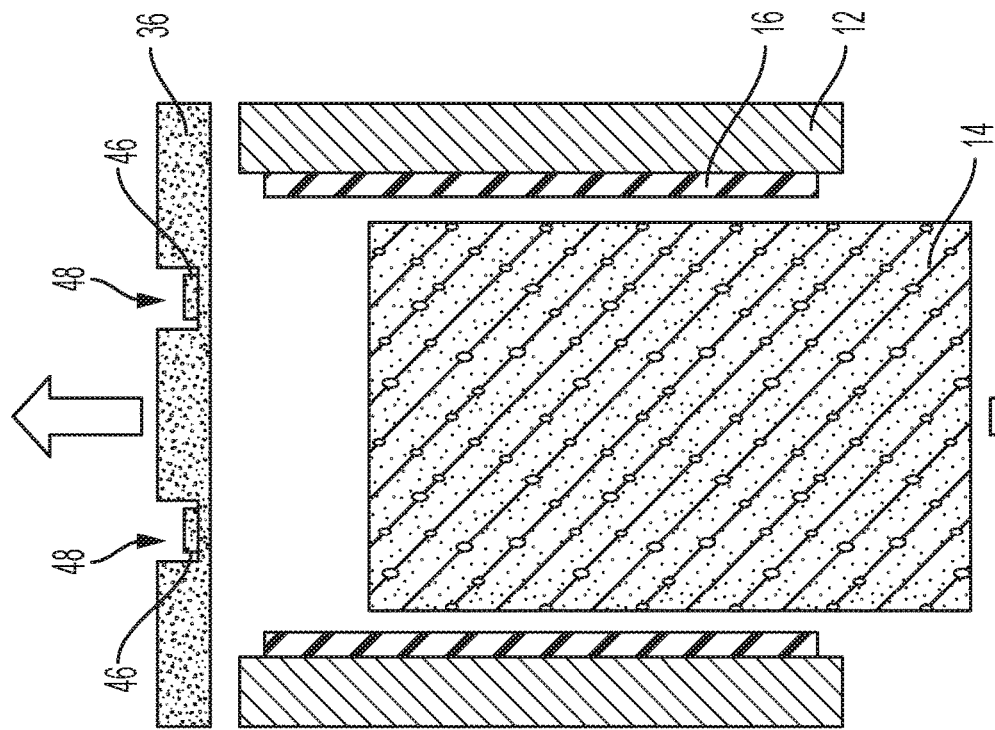
FIG. 10C is a cross-section view of an isostatic strength testing apparatus in a third stage of testing, according to an example.

During the next stage, shown in FIG. 10C, a predetermined compressive force is applied, radially, to the sample 14. The pressure can be applied by the pressure subsystem to a predetermined pressure value. During the test, the controller 44 can record signals received from the acoustic sensors, each of which can be analyzed for features indicative of a failure, as described above. The pressure value can be monitored by the pressures sensor 42 in communication with the controller 44. Once the predetermined pressure is reached, the controller 44 can deactivate or reverse the pump 40 to cease applying pressure to the sample 14.

Figure 10D:
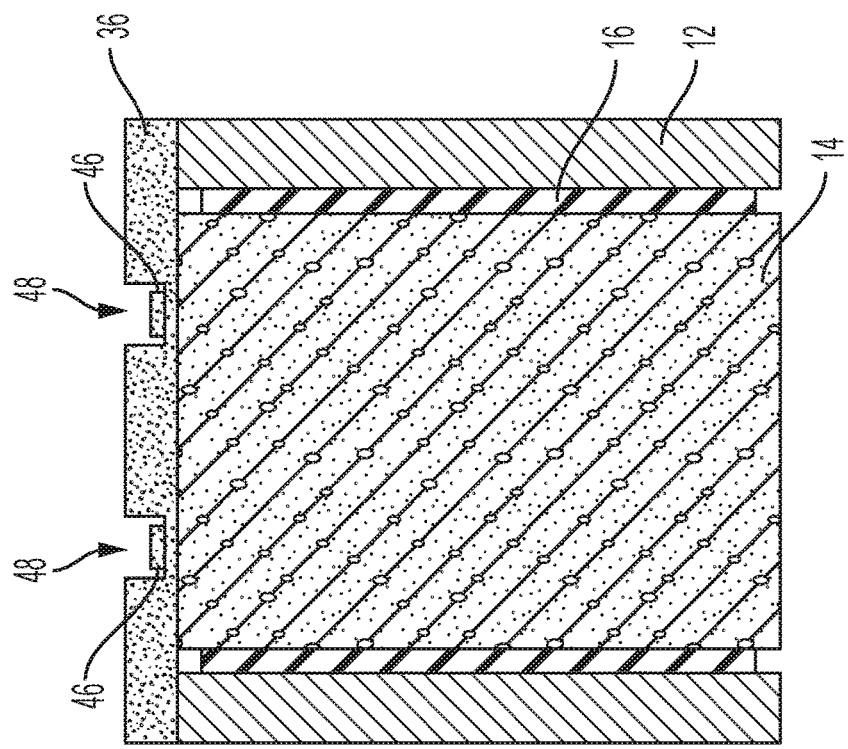
FIG. 10D is a cross-section view of an isostatic strength testing apparatus in a first stage of testing, according to an example.

After the test is completed, as shown in FIG. 10D, the sample 14 can be ejected (by a user or robotically) from an open end of apparatus 10 (in an alternate example, the sample 14 can be ejected from the top of the apparatus 10). The above apparatus 10 and method depicted in FIGS. 10A-10D permits rapid in-line testing of each produced honeycomb ceramic body within a batch. For example, samples 14 to be tested can be continuously loaded into the test apparatus (e.g., via a first end), tested by applying pressure circumferentially and monitoring for audio signals indicative of failure (cracking), and then ejected from the testing apparatus (e.g., via a second end opposite to the first end) once the predetermined pressure has been reached. For example, a sequence of samples 14 (e.g., on a conveyor) can be continuously conveyed to the testing apparatus, and then loaded, tested, and ejected in this manner. Those of the samples that "fail" can be discarded or designated for discarding, e.g., placed in a scrap receptacle, while those of the samples that "pass" can be designated for installation in an exhaust treatment system.

Thus, various embodiments disclosed herein comprise isostatic strength testing apparatuses configured for rapid in-line testing, and which include acoustic sensors with high signal-to-noise ratios with respect to waveforms received from tested samples, as well as methods for testing such samples.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An apparatus for evaluating the radial compressive strength of a ceramic honeycomb sample, comprising:
    a housing defining a testing compartment;
    a pressure subsystem configured to introduce a pressurizing fluid into the testing compartment;
    a flexible member disposed within the testing compartment and in fluid communication with the pressure subsystem, the flexible member defining a testing area within the testing compartment configured to receive the ceramic honeycomb sample, wherein the flexible member is configured to expand inwardly and subject the honeycomb sample to a compressive force by engaging against the outer surface of the honeycomb sample when pressurized by the pressurizing fluid;
    an end cap covering an end face of the ceramic honeycomb sample when the ceramic honeycomb sample is positioned in the testing compartment; and
    an acoustic sensor disposed on the end cap and configured to translate acoustic waveforms propagating through the acoustic sensor to a signal representative of the acoustic waveforms,
        wherein the acoustic sensor is engaged with a waveguide defined by the end cap.

2. The apparatus of claim 1, wherein the end cap is in direct contact with the end face of the honeycomb sample when the honeycomb sample is loaded in the testing compartment.

3. The apparatus of claim 2, wherein the end cap comprises a protective pad that is in direct contact with the end face of the honeycomb sample when the honeycomb sample is loaded in the testing compartment.

4. The apparatus of claim 1, wherein the waveguide is comprised of a material having a density greater than a density of the ceramic honeycomb sample.

5. The apparatus of claim 1, wherein the waveguide comprises a thickness separating the acoustic sensor from the end face of the honeycomb sample that is equal to a multiple of a quarter-wavelength ($n\lambda/4$) of a predetermined frequency, wherein the predetermined frequency is within a range detectable by the acoustic sensor.

6. The apparatus of claim 5, wherein the predetermined frequency is selected as a frequency expected to be produced when walls of the honeycomb sample experience cracking.

7. The apparatus of claim 5, wherein the end cap comprises a channel and the acoustic sensor is located at an end of the channel that positions the acoustic sensor proximate to the testing compartment.

8. The apparatus of claim 1, further comprising a pressure sensor configured to monitor a pressure of the pressurizing fluid.

9. An apparatus for evaluating the radial compressive strength of a ceramic honeycomb sample, comprising:
    a housing defining a testing compartment;
    a pressure subsystem configured to introduce a pressurizing fluid into the testing compartment;
    a flexible member disposed within the testing compartment and in fluid communication with the pressure subsystem, the flexible member defining a testing area within the testing compartment configured to receive the ceramic honeycomb sample, wherein the flexible member is configured to expand inwardly and subject the honeycomb sample to a compressive force by engaging against the outer surface of the honeycomb sample when pressurized by the pressurizing fluid;
    an end cap covering an end face of the ceramic honeycomb sample when the ceramic honeycomb sample is positioned in the testing compartment; and
    an acoustic sensor disposed on the end cap and configured to translate acoustic waveforms propagating through the acoustic sensor to a signal representative of the acoustic waveforms, and
    a controller in signal communication with the acoustic sensor and configured to analyze the signal for an indicator of a compromised wall of the ceramic honeycomb sample.

10. The apparatus of claim 9, wherein the indicator comprises an amplitude of the acoustic waveform detected by the acoustic sensor exceeding a threshold.

11. The apparatus of claim 9, wherein the waveguide is comprised of a material having a density greater than a density of the ceramic honeycomb sample.

12. The apparatus of claim 9, further comprising a pressure sensor configured to monitor a pressure of the pressurizing fluid.

13. The apparatus of claim 9, wherein the acoustic sensor is engaged with a waveguide defined by the end cap.

14. A method for testing the compressive strength of a ceramic honeycomb sample, comprising the steps of:
applying a predetermined radial compressive pressure to a ceramic honeycomb sample;
generating one or more signals from an acoustic sensor disposed in an end cap covering an end face of the ceramic honeycomb sample; and
analyzing the one or more signals for an indicator of a compromised wall of the ceramic honeycomb sample, by at least one of:
comparing an amplitude of the acoustic waveform detected by the acoustic sensor to a first threshold value,
determining whether a count of acoustic waveform amplitudes exceed a second threshold value, and
determining whether a risetime of one or more peak of the acoustic waveforms, or an average risetime of the one or more peaks, exceeds a third threshold value.

15. A method for testing the compressive strength of a ceramic honeycomb sample, comprising the steps of:
applying a predetermined radial compressive pressure to a ceramic honeycomb sample;
generating one or more signals from an acoustic sensor disposed in an end cap covering an end face of the ceramic honeycomb sample; and
analyzing the one or more signals for an indicator of a compromised wall of the ceramic honeycomb sample, wherein the acoustic sensor is engaged with a waveguide defined by the end cap.

16. The method of claim 15, wherein the step of analyzing the one or more signals for an indicator of a compromised wall of the ceramic honeycomb sample comprises an amplitude of the acoustic waveform detected by the acoustic sensor to a threshold value.

17. The method of claim 15, wherein the step of analyzing the one or more signals for an indicator of a compromised wall of the ceramic honeycomb sample comprises determining whether at least one of a count of acoustic waveform amplitudes, a risetime of one or more peak of the acoustic waveforms, or an average risetime of the one or more peaks, exceeds a threshold.

18. The method of claim 15, wherein the waveguide comprises a thickness separating the acoustic sensor from the end face of the honeycomb sample that is equal to a multiple of a quarter-wavelength ($n\lambda/4$) of a predetermined frequency, wherein the predetermined frequency is within a range detectable by the acoustic sensor.

19. The method of claim 18, wherein the predetermined frequency is selected as a frequency expected to be produced when walls of the honeycomb sample experience cracking.

* * * * *